United States Patent
Webber et al.

(10) Patent No.: US 6,168,191 B1
(45) Date of Patent: Jan. 2, 2001

(54) INFLATABLE AIR BAG FOR AN AUTOMOTIVE VEHICLE

(75) Inventors: James Lloyd Webber, Shelby Township, Macomb County, MI (US); Douglas Stephen Weston, Tipp City; Nicole M. Mahmood, New Carlisle, both of OH (US)

(73) Assignee: Delphi Technologies, Inc., Troy, MI (US)

( * ) Notice: Under 35 U.S.C. 154(b), the term of this patent shall be extended for 0 days.

(21) Appl. No.: 09/330,067

(22) Filed: Jun. 11, 1999

(51) Int. Cl.[7] .................................................. B60R 21/22
(52) U.S. Cl. ...................................... 280/730.2; 280/743.2
(58) Field of Search ........................... 280/728.1, 728.2, 280/730.1, 730.2, 743.1, 743.2

(56) References Cited

U.S. PATENT DOCUMENTS

| | | |
|---|---|---|
| 3,731,949 | 5/1973 | Radke . |
| 3,792,873 | 2/1974 | Buchner et al. . |
| 3,801,125 | 4/1974 | Knight, IV et al. . |
| 3,897,961 | 8/1975 | Leising et al. . |
| 4,227,717 | 10/1980 | Bouvier . |
| 4,966,388 | 10/1990 | Warner et al. . |
| 5,322,322 | 6/1994 | Bark et al. . |
| 5,333,899 | 8/1994 | Witte . |
| 5,566,977 | 10/1996 | Wipasuramonton . |
| 5,588,672 | 12/1996 | Karlow et al. . |
| 5,884,937 | * 3/1999 | Yamada .............................. 280/730.2 |
| 5,957,487 | * 9/1999 | Stutz ................................... 280/730.2 |

FOREIGN PATENT DOCUMENTS

| | | |
|---|---|---|
| 41 34 995 C1 | 3/1993 | (DE) . |
| 43 07 175 A1 | 9/1993 | (DE) . |
| 42 31 522 A1 | 3/1994 | (DE) . |
| 0 584 781 A1 | 8/1993 | (EP) . |
| 0 590 518 A1 | 9/1993 | (EP) . |
| 962946 | 7/1984 | (GB) . |
| 2 191 450 | 12/1987 | (GB) . |
| 2 261 636 | 5/1993 | (GB) . |
| 2 278 812 | 12/1994 | (GB) . |
| 5-131889 | 3/1993 | (JP) . |

* cited by examiner

Primary Examiner—Paul N. Dickson
Assistant Examiner—Faye M. Fleming
(74) Attorney, Agent, or Firm—Kathryn A. Marra

(57) ABSTRACT

A side impact air bag with a self-tensioned lower edge to prevent the occupant from ejection during a rollover event or subsequent impact, A side air bag is secured to the vehicle roof rail between the front and rear pillars. A pair of tethers are secured to the air bag at a lower portion thereof and one each in turn secured to the front and rear pillars. A plurality of substantially inverted V-shaped zero length tethers extend from the lower portion to define a plurality of chambers, which when inflated cause the lower portion of the air bag to shrink and induce tension therein and to the tethers. When the side impact air bag is inflated the air bag positions itself between the occupant and vehicle window and is held in place by the tension created by the inflated sections.

16 Claims, 4 Drawing Sheets

INFLATABLE AIR BAG FOR AN AUTOMOTIVE VEHICLE

BACKGROUND OF THE INVENTION

1. Field of the Invention

This invention relates to an inflatable air bag for an automotive vehicle and more particularly to a self-tensioning side impact air bag.

2. Description of the Related Art

Air bags mounted in an instrument panel or steering wheel to protect an occupant from a front impact have become standard in the automotive industry. Numerous variations of these air bags, deployment systems and housing devices have evolved over the years. However, these frontal air bags do not provide protection to the occupant during a side impact. Recent developments have focussed on technology directed to side impact air bags and related systems.

Side impact air bag systems are also known in the art. These side impact air bags are often mounted adjacent the vehicle's roof rail, doorframe or center pillars, or in some instances within the side door. It is desirable to have tensioning that positions the bag during side impact as well as any secondary events.

FIGS. 6A, 6B, and 7 depict a side impact air bag 1 of the related art. The air bag 1 includes an inflatable element 2 having a top edge 3 and a lower edge 4. A front tether 5 and rear tether 6 connect the inflatable element 2 to corresponding front and rear pillars of an automotive vehicle. The top edge 3 has a plurality of mounting connections 7 for connection to the vehicle's roof rail. The inflatable element 2 has a plurality of straight substantially square zero length tethers 8 extending from the lower edge 4 to the top edge 3. FIG. 6B depicts the air bag of FIG. 6A in an inflated state. The inflatable element 2 shrinks when inflated and induces tension in the lower edge 4 and the tethers 5, 6. This tension holds the air bag 1 in place relative to the vehicle. When the air bag 1 is mounted to the vehicle, the top edge 3 is fixed and cannot shrink in the horizontal direction when inflated and therefore the lower edge 4 tends to shrink as the top edge 3 retains its original shape. Thus the chambers 9, created by the straight zero length tethers 8 tend to push against each other on the lower corners 10, and tend to overlap. The amount of overlap, however, is restricted by the width of the zero length tethers 8. Therefore, the amount the lower edge 4 is allowed to shrink is limited, thereby limiting the amount of tension induced during inflation. The air bag 1 of FIGS. 6A & 6B suffers from the drawback in that tension is created between the mounting connections 7 between the top edge 3 of the inflatable element 2 and the corner 11 of the chambers 9 as generally depicted by tension lines 12. The tension lines 12 restrict the shrinkage potential along the lower edge 4 of the inflatable element 2. Therefore, it is desirable to improve this arrangement.

SUMMARY OF THE INVENTION

It is an object of the invention to provide an improved side impact air bag that overcomes the drawbacks of and improves upon the prior art and other related art.

The present invention is directed to a side impact air bag with a self-tensioned lower edge to position the air bag during a side impact, rollover event, or subsequent impact. A side air bag is secured to the vehicle along the roof rail between the front and rear pillars. A pair of tethers is secured to the air bag at a lower portion thereof and one each in turn secured to the front and rear pillars. A plurality of substantially inverted V-shaped zero length tethers extend from the lower portion to define a plurality of chambers, which when inflated, cause the lower portion of the air bag to shrink and induce tension therein as well as to the tethers. When the side impact air bag is inflated it positions itself between the occupant and vehicle window and is held in place by the tension created by the inflated chambers. The side impact airbag may also prevent an occupant from being ejected during a roll over event or subsequent impact.

DETAILED DESCRIPTION OF THE PREFERRED EMBODIMENTS

Figure 1:
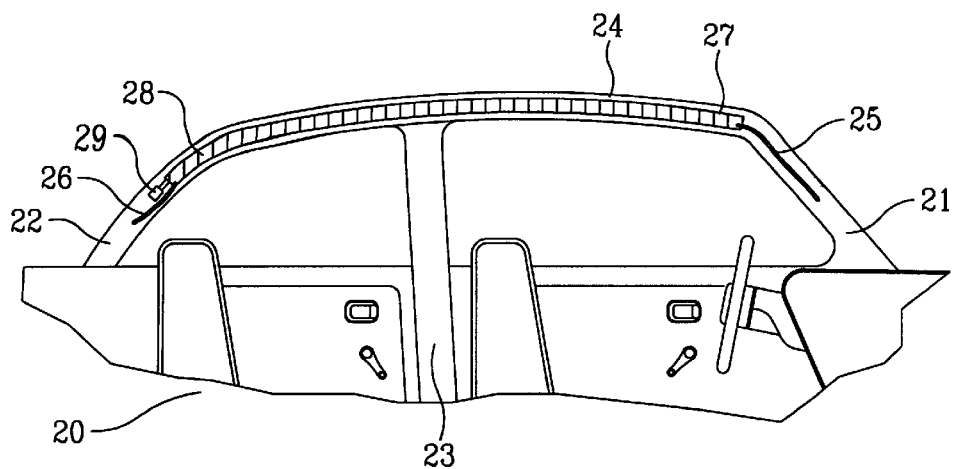
FIG. 1 is an elevation view of a side impact air bag of the present invention mounted to an automotive vehicle in a stored position.

FIG. 1 is directed to an air bag of the present invention mounted to an automotive vehicle in a stored non-deployed state. An automobile 20, has a front pillar 21, a rear pillar 22 and a center pillar 23. An air bag 1 is stored and mounted to the vehicle roof rail 24. A first tether 25 connects a front portion 27 of the air bag 1 to the front pillar 21. A second tether 26 connects a rear portion 28 of the air bag 1 to the rear pillar 22. The rear portion 28 of the air bag 1 is connected to a gas generator 29, or a duct leading from a gas generator to facilitate ingress of gas to the airbag 1.

FIG. 2 is directed to a side impact air bag 101 of the present invention. Preferably tethers 125, 126 secure the inflatable element 102 between the A-pillar 121 and C-pillar 122 spanning the B-pillar 123. However, the air bag 101 may be made to extend more rearwardly and secured to a D-pillar of a longer vehicle. Furthermore, the airbag 101 may be employed only in the forward compartment of the vehicle and connected to the A-pillar and B-pillars. It is preferred, however, to employ a single air bag 101 for both the front and rear passenger compartments, and therefore connect the inflatable element to the A-pillar (or front pillar 121) and the C-pillar (rear pillar 122.

The inflatable element 102 may be made of any suitable air bag material for holding gas, but is preferably made of two sheets of woven nylon fabric lined with urethane or other substantially impervious material such as silicone. The two urethane coated nylon sheets are secured to one another along an outer periphery thereof to define the overall air bag shape. A plurality of inverted substantially V-shaped zero length tethers 108 also connect the two nylon sheets to provide the inverted substantially V-shaped zero length tethers 108. The two sheets are connected along the pattern shown in dotted lines in FIG. 2A. Preferably, the nylon sheets are secured to one another by heating selected portions of the fabric dialectrically. The urethane or silicone coating of each of the two nylon sheets is laid against each other and together line the interior of the inflatable element 102. The inflatable element is then dialectrically treated to heat the outer periphery and zero length tethers 108 causing the coating to adhere to one another. This forms a gas tight seal along the outer peripheral surface and zero length tethers 108. The two coated nylon sheets may also be stitched along the outer periphery and zero length tethers 108 to increase structural integrity sufficient to tolerate loads during inflation. When stitching is employed, it is preferred to treat the stitched area with a gas impervious substance to minimize gas leakage. Otherwise, the stress induced during inflation causes small holes in the stitching to widen and permit gas to escape thereby increasing deflation time.

Figure 2A:
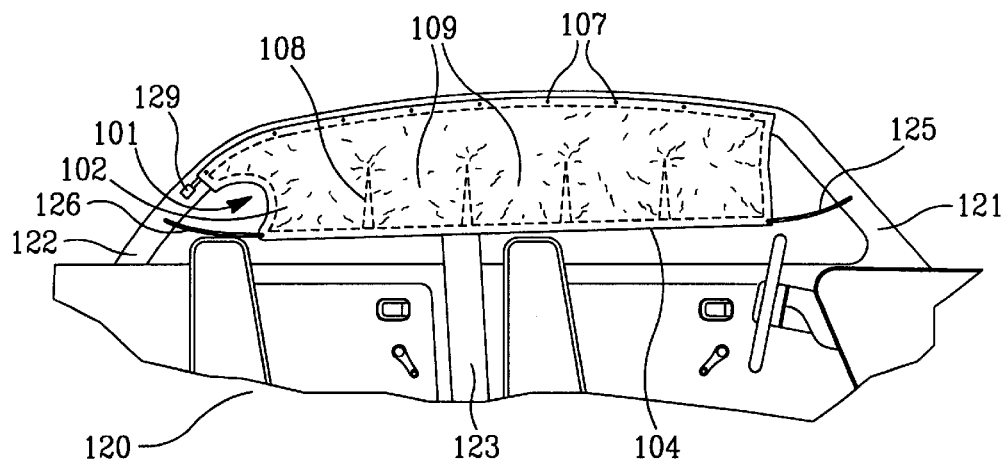
FIG. 2A is an elevation view of a side impact air bag according to one embodiment of the present invention mounted to a vehicle in a deployed non-inflated state.

When the air bag 102 inflates, the zero length tethers 108 cause the air bag 101 to inflate defining a plurality of separate chambers 109. The zero length tethers 108 are preferably zero length between the two sheets of the air bag 101 Specifically, the two sheets are secured directly adjacent to one another thereby interconnecting opposite sides of the inflatable element 2. In the embodiment of FIG. 2A, four inverted substantially V-shaped zero length tethers 108 are formed to define five separate chambers 109 and four separate zero length tethers 108. The substantially V-shaped zero length tethers 108 are wider along the lower edge 104 than at a top portion thereof. Such an arrangement facilitates greater shrinkage of the lower edge 104 of the inflatable element 102 when inflated, thereby inducing tension along the lower edge 104 as well as to the first and second tethers 125, 126.

Figure 2B:
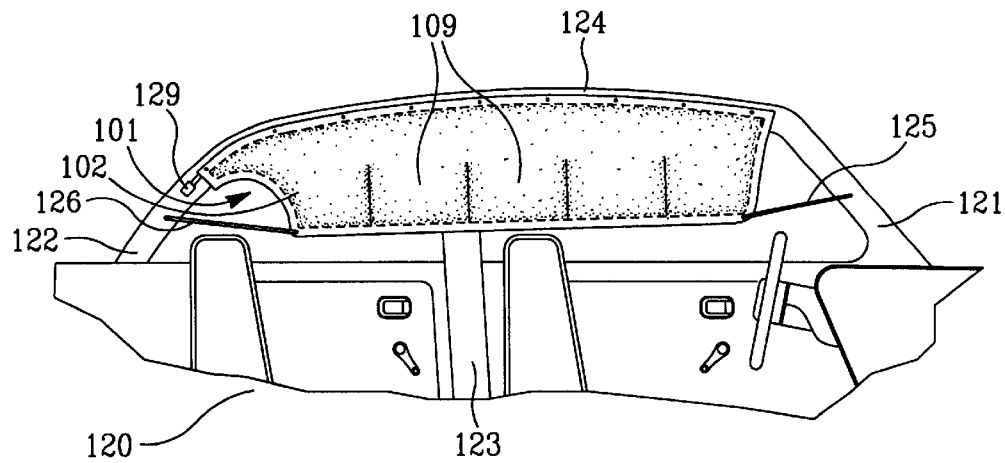
FIG. 2B is an elevation view of the side impact air bag of FIG. 2A in an inflated state.

The inflatable element is stored in a compartment mounted to the roof rail 24 as shown in FIG. 1. Tethers 125 and 126 are also stored in a compartment in a corresponding pillar 121, 122. When a side impact is detected, the air bag 101 is inflated by gas from generator 29. The inflatable element 101 extends downward and is positioned and retained by the tethers 125, 126 as well as the point-wise mounting connections 107. As gas fills the inflatable element 102, the lower edge 104 shrinks by virtue of the inflation of the separate chambers 109 as shown in FIG. 2B. Tension is thereby induced in the lower edge 104 as well as the tethers 125, 126. Note that the tethers 125, 126 are taut in the inflated state shown in FIG. 2B. The inflatable element 102 is thereby positioned between the occupant and the door or window opening to protect the occupant from side impacts and subsequent events, such as rollover or secondary impact. The inverted V-shape of the zero length tethers 108 allow the lower edge 104 of the inflatable element 102 to shrink more at the lower edge 104 for generating greater tension on the tethers 5, 6 and enhancing the ability to retain the inflatable element 102 relative to the vehicle 20.

Figure 6A:
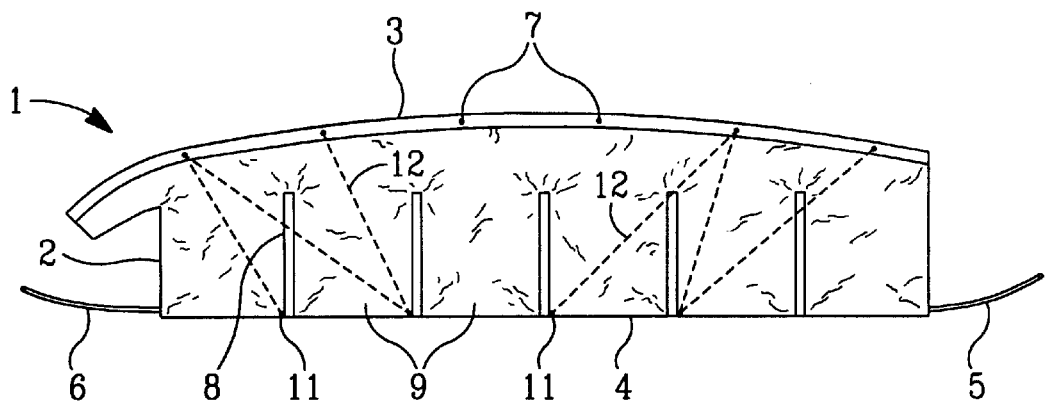
FIG. 6A is an elevation view of a side impact air bag of the related art in a non-inflated stated.

The inverted V-shaped zero length tethers 108 are superior to the straight substantially square zero length tethers 8 depicted in FIGS. 6A & B. The inverted substantially V-shaped zero length tethers 108 allow the chambers 109 to fit together and enhance the ability of the lower edge to shrink generating greater tension on the tethers 125, 126. Therefore, the arrangement depicted in FIGS. 2A & 2B is preferred to that depicted in FIGS. 6A & 6B.

Figure 3A:
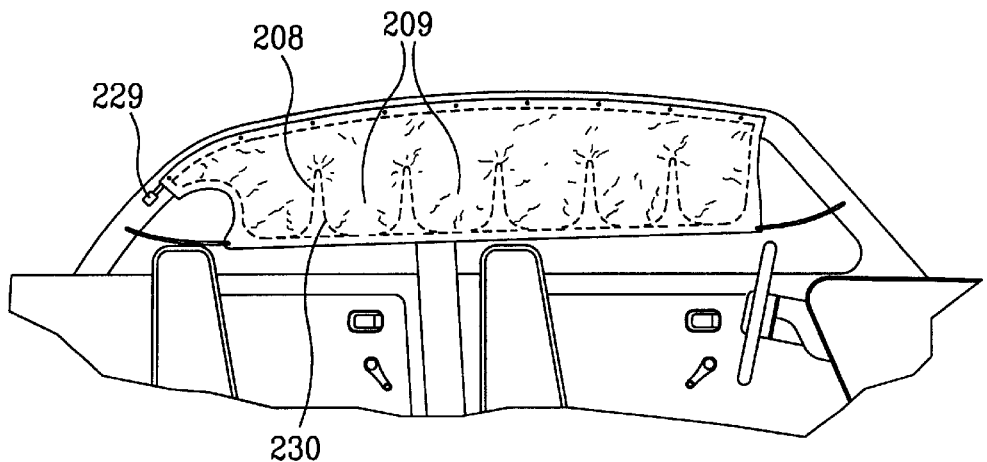
FIG. 3A is an elevation view of a side impact air bag according to an alternate embodiment of the present invention mounted to a vehicle in a deployed non-inflated.
Figure 3B:
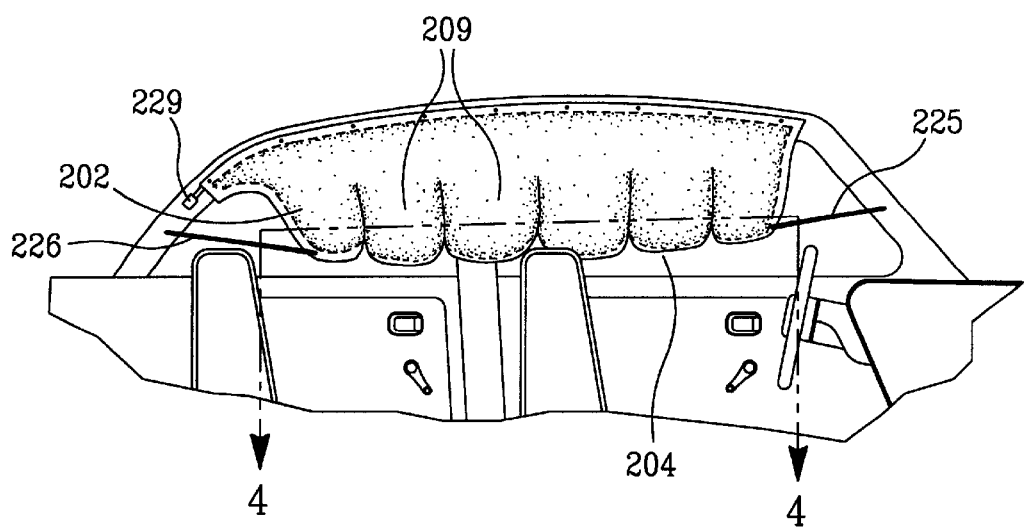
FIG. 3B is an elevation view of the side impact air bag of FIG. 3A in an inflated state.
Figure 4:
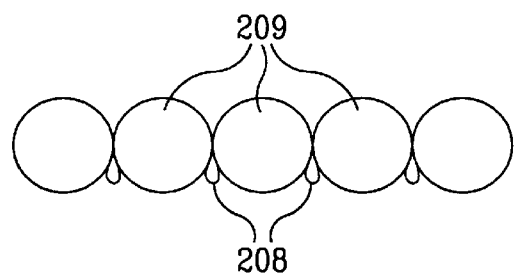
FIG. 4 is a sectional view of the side impact air bag of FIG. 3b taken along line 4—4.

FIGS. 3A, 3B, and 4 depict an alternate embodiment of the inflatable element employing an alternative inverted substantially V-shaped zero length tether 208. The lower portion 230 of the zero length tethers 208 are curved outwardly to provide a smooth contoured transition between the zero length tethers 208 and the lower edge 204 as shown by reference numeral 230. Placing a radius or outwardly directed curve 230 reduces the tendency of the chambers 209 to overlap while allowing the lower edge to shrink more. FIG. 4 is a cross section of the lower portion 230 of the inflated element 202 of FIG. 3B. The separate chambers 209 to do not overlap while the lower edge 204 is allowed to shrink greatly. FIG. 3B shows chambers 209 positioned adjacent one another without limitation of the zero length tethers 208. The tethers 225 and 226 are taut. Contrary to the embodiment of FIGS. 3A & 3B, the arrangement of FIGS. 6A & 6B tend to cause the chambers 9 to overlap and restrict the ability of the lower edge 4 to shrink. Thus, the embodiment of FIGS. 3A & 3B is much preferred to provide a smooth lower edge for occupant interaction.

Figure 5A:
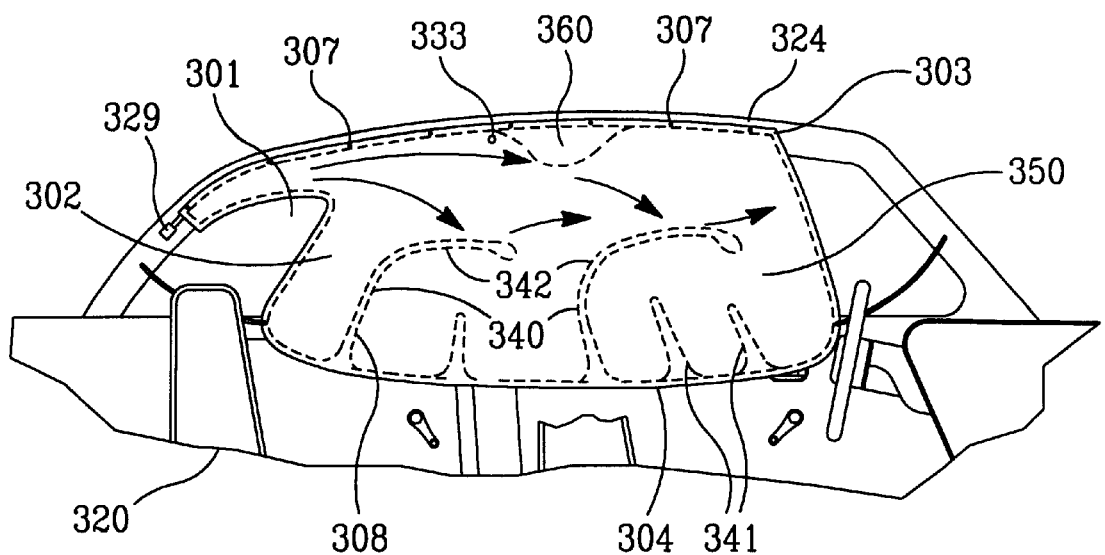
FIG. 5A is an elevation view of a side impact air bag according to the preferred embodiment of the present invention mounted to a vehicle in a deployed non-inflated state.
Figure 5B:
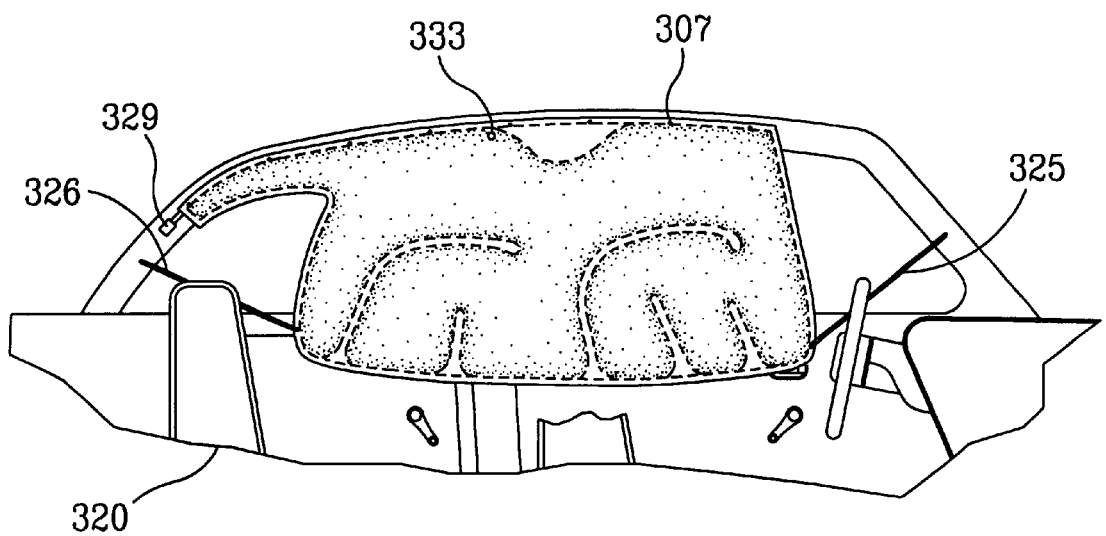
FIG. 5B is an elevation view of the side impact air bag of FIG. 4A in an inflated state.

FIGS. 5A & 5B depict the air bag 301 according to another preferred embodiment of the present invention. The vehicles seat has been cutaway to demonstrate the relative position of the air bag 302 relative to the vehicle 320. A substantially fan-shaped inflatable element 302 has a curved lower edge 304, whose radius of curvature generally converges on pivot point 333. The inflatable element 302 is secured to the vehicle 320 in a manner similar to that of the embodiment depicted in FIG. 1. A top edge 303 is secured to the roof rail 324, or other opening adjacent the vehicle roofline at several point-wise mounting connections 307. The point-wise mounting connections 307, may be rivets, screws, bolts or other fasteners that will adequately retain the air bag during inflation.

Figure 6B:
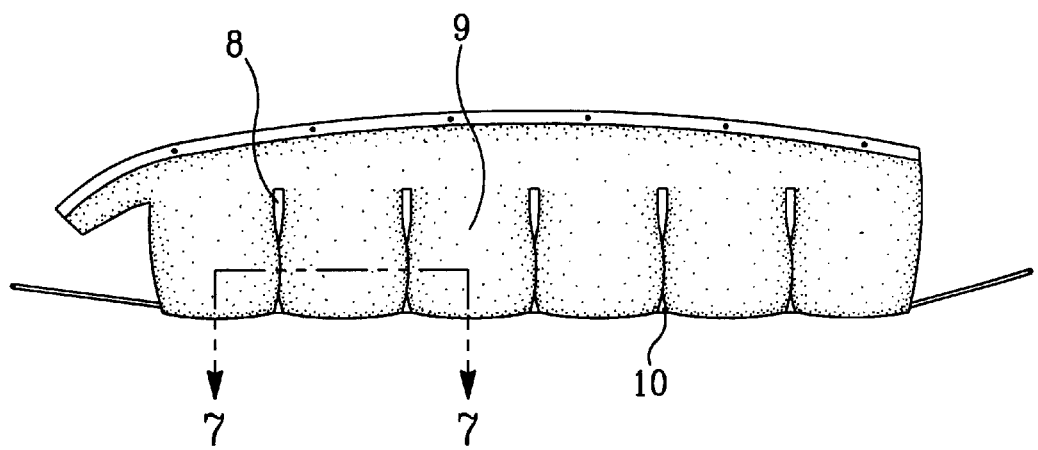
FIG. 6B an elevation view of the side impact air bag of FIG. 6A in an inflated state
Figure 7:
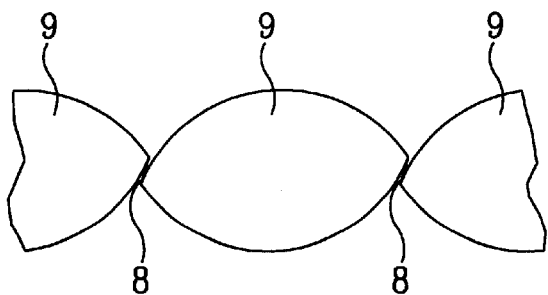
FIG. 7 is a section view side impact air bag of FIG. 6B taken along line 7—7.

A plurality of zero length tethers 340, 341 interconnecting opposite sides of the fan-shaped inflatable element extends from the lower edge 304 in a direction generally toward the pivot point 333. Such an arrangement alleviates a drawback in the arrangement depicted in FIGS. 6A & 6B. In the arrangement of FIGS. 6A & 6B, tension is created between the mounting connections 7 along the top edge 3 of the inflatable element 2 and the corner of the chambers 9 as generally shown by tension lines 12. This restricts the shrinkage potential along the lower edge 4 of the inflatable element 2.

The fan-shaped inflatable element 302 and converging oriented zero length tethers 308 of the embodiment of FIGS. 5A & 5B allow tension to be created at the lower edge 304 of the fan-shaped inflatable element 302 while creating little stress on the top edge 303 of the inflatable element 302. This arrangement acts much like a folding fan that pivots about pivot point 333. Tension is therefore not created between the mounting connections 307 and the lower edge 304 of the fan-shaped inflatable element 302. The lower edge 304 of the fan-shaped inflatable element 302 can move upward and is not restricted by the mounting connections 307 as in the arrangement of FIGS. 6A & 6B. As the fan-shaped inflatable element 302 inflates, it becomes thicker and shrinks in the horizontal direction and thereby induces tension in the tethers 325, 326.

The fan-shaped inflatable element 302 preferably has two lengthened primary zero length tethers 340, and three secondary zero length tethers 341 being shorter than the primary zero length tethers 340. The secondary zero length tethers 341 are generally configured as inverted substantially V-shaped zero length tethers directed generally towards pivot point 333. The primary zero length tethers 340 extend toward the top edge 303 beyond the secondary zero length tethers 341 and have a lateral portion 342 further extending laterally toward a forward chamber 350 positioned opposite the rear portion of the air bag connected to the gas generator 329. A top seam portion 360 is positioned adjacent the pivot point 333 and disposed between the two primary zero length tethers 340 relative to the forward chamber 350. The top seam 360 also interconnects opposite sides of the inflatable element 302. During inflation the top seam 360 and lateral portions 342 of the primary zero length tethers 340 together and separately serve as a deflector to direct gas to the forward chamber 350. Such an arrangement facilitates uniform inflation of the inflatable element 302. The top seam 360 also serves to maintain a consistent overall thickness of the inflatable element 302 when inflated to enable deployment at substantially less pressure.

Each of the embodiments of the present invention provides an airbag tensioned along the lower edge to positively retain and position the air bag relative to the vehicle. The embodiment of FIGS. 2A & 2B have a plurality inverted substantially V-shaped zero length tethers 108. The V-shape promotes the ability of the lower edge 104 to restrict without limitation thereby increasing the amount of tension applied to the first and second tethers 125, 126. In the embodiment of FIGS. 3A & 3B, the inverted substantially V-shaped tethers 208 have outwardly directed curve 230 to provide a wide smooth transition between the lower edge 204 and the tethers 208. This arrangement increases the ability of the tethers 208 to shrink and induce greater tension in the lower edge 204 and the first and second tethers 125, 126, thereby increasing the ability to position and retain the inflatable element 202 in a deployed state.

The embodiment of FIGS. 5A & 5B provide primary tethers 340 and secondary tethers 341 generally directed to a pivot point 333 adjacent the top edge 303 of the inflatable element 302. This arrangement reduces tension between the mounting connections 307 which would otherwise reduce the ability of the lower edge 304 to shrink. Deflector portions in the form of lateral portions 342 and top seam 360, further serve to direct air towards the forward chamber 350 to more uniformly inflate the inflatable element 302. The top seam 360 further maintains a uniform thickness of the inflatable element 302 to facilitate inflation of the inflatable element at substantially reduced pressure.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. An air bag module in an automotive vehicle comprising:
   an inflatable element adapted to be inflated when connected to a gas generator and injected with pressurized gas, said inflatable element having a top edge and a lower edge, said top edge being secured to said vehicle; said inflatable element having
   a plurality of inverted substantially V-shaped zero length tethers extending upward from said lower edge and interconnecting a pair of opposite sides of said inflatable element, wherein when said inflatable element is inflated, said zero length tethers define a plurality of chambers extending between said top and lower edges.

2. The air bag according to claim 1, wherein, a first tether connects a front portion of said lower edge of said inflatable element to a front pillar of said vehicle, and a second tether connects a rear portion of said lower edge to a rear pillar of said vehicle, whereby when said inflatable element is in an inflated state said plurality of chambers are constricted together thereby reducing a distance of said lower edge and inducing tension in to said first and second tethers to positively position and retain said inflatable element relative to said vehicle.

3. The air bag according to claim 1, wherein a lower portion of said inverted substantially V-shaped zero length tethers are curved outward thereby providing a smooth contoured transition between said zero length tethers and said lower edge.

4. The air bag according to claim 2, wherein said top portion of said inflatable element is secured to said roof rail at a plurality of discrete point-wise mounting connections.

5. The air bag according to claim 2, wherein said plurality of inverted substantially V-shaped zero length tether comprises four zero length tethers defining five separate chambers.

6. The air bag according to claim 2, wherein said plurality of inverted substantially V-shaped zero length tethers comprise five zero length tethers defining six separate chambers.

7. The air bag according to claim 1, wherein said zero length tethers extend beyond a midpoint between said top and lower edges and terminates at a point distanced below said top edge to facilitate sufficient inflation of each of said chambers when injected with said pressurized gas.

8. An air bag module in an automotive vehicle comprising:
   a substantially fan-shaped inflatable element adapted to be inflated when connected to a gas generator and injected with pressurized gas, said substantially fan-shaped inflatable element having a top and a lower edge; said inflatable element having;
   a plurality of zero length tethers extending from said lower edge towards said top edge in a direction generally converging on a pivot point proximate said top edge, said zero length tethers interconnecting a pair of opposites sides of said inflatable element, wherein when said inflatable element is inflated, said zero length tethers define a plurality of chambers.

9. The air bag according to claim 8, wherein said inflatable element further comprises:
   a top seam portion located proximate said pivot point and interconnecting said opposite sides of said air bag.

10. The air bag according to claim 9, wherein said top seam portion has a deflector portion adapted to deflect injected gas towards a forward chamber located opposite a rear portion and said gas generator.

11. The air bag according to claim 10, wherein said plurality of zero length tethers further comprises at least one primary zero length tether and at least one secondary zero length tether, said at least one primary zero length tether extending from said lower edge generally toward said pivot point beyond said at least one secondary zero length tether and having a lateral portion further extending substantially laterally towards said forward chamber, said lateral portion of said primary zero length tether and said deflector portion of said top seam together deflecting injected gas towards said forward chamber and facilitating a uniform inflation of said inflatable element during inflation.

12. The air bag according to claim 8, wherein said lower edge is curved having a radius of curvature converging proximate said pivot point.

13. The air bag according to claim 12, wherein said top edge of said inflatable element is secured to a roof rail of said vehicle, a first tether connects a front portion of said lower edge of said inflatable element to a front pillar of said vehicle, and a second tether connects a rear portion of said lower edge to a rear pillar of said vehicle, said inflatable element, when inflated being positively positioned and retained relative to said vehicle to prevent injury to an occupant of said vehicle.

14. The air bag according to claim 13, wherein said top edge of said inflatable element is secured to said roof rail at a plurality of discrete point-wise mounting connections.

15. The air bag according to claim 11, wherein said at least one primary zero length tether comprises two primary zero length tethers, and said at least one secondary zero length tether comprises three secondary zero length tethers, at least one secondary zero length tether being disposed between said two primary zero length tether, one of said primary zero length tether being positioned on opposite sides of said top seam relative to said forward chamber.

16. An air bag module in an automotive vehicle, said air bag comprising:

a substantially fan shaped inflatable element adapted to be inflated when connected to a gas generator and injected with pressurized gas, said substantially fan-shaped inflatable element having a top edge secured to a roof rail of said vehicle and a lower edge secured to said vehicle by a first tether connecting a front portion of said lower edge to a front pillar and a second tether connecting a rear portion of said lower edge to a rear pillar, wherein when inflated said inflatable element is positioned and retained relative to said vehicle; said inflatable element having;

a plurality of zero length tethers interconnecting a pair of opposites sides of said inflatable element, wherein when said inflatable element is inflated, said zero length tethers define a plurality of chambers, said plurality of zero length tethers including;

two primary zero length tethers extending from said lower edge generally toward a pivot point and having a lateral portion further extending towards a forward chamber located opposite a rear portion and said gas generator, three secondary zero length tethers having a length substantially shorter than said primary zero length tethers, said secondary zero length tethers extending from said lower edge generally towards said pivot point, at least one secondary zero length tether being disposed between said two primary zero length tethers, a top seam portion located proximate said pivot and being disposed between said two primary zero length tethers relative to said forward chamber, said lateral portion of said primary zero length tethers and said top seam portion together deflecting injected gas towards said forward chamber and facilitating a uniform inflation of said inflatable element;

wherein, said lower edge of said inflatable element is curved having a radius of curvature substantially converging on said pivot point.

* * * * *